(12) United States Patent
Greetham

(10) Patent No.: US 9,160,255 B2
(45) Date of Patent: Oct. 13, 2015

(54) METHOD OF PREHEATING A BRUSHLESS MOTOR

(71) Applicant: Dyson Technology Limited, Wiltshire (BG)

(72) Inventor: Stephen Greetham, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 46 days.

(21) Appl. No.: 13/933,896

(22) Filed: Jul. 2, 2013

(65) Prior Publication Data

US 2014/0009099 A1 Jan. 9, 2014

(30) Foreign Application Priority Data

Jul. 3, 2012 (GB) .................................. 1211754.5

(51) Int. Cl.
*H02P 1/00* (2006.01)
*H02P 1/46* (2006.01)

(52) U.S. Cl.
CPC . *H02P 1/00* (2013.01); *H02P 1/465* (2013.01)

(58) Field of Classification Search
CPC ........................................................ H02P 1/00
USPC .................. 318/558, 811, 810, 807, 767, 727
See application file for complete search history.

(56) References Cited

U.S. PATENT DOCUMENTS

| 1,856,133 | A | 5/1932 | McClatchie |
| 2,621,756 | A | 12/1952 | Senne |
| 2,686,330 | A | 8/1954 | Wales |
| 3,995,204 | A | 11/1976 | Konrad et al. |
| 4,686,437 | A | 8/1987 | Langley et al. |
| 5,125,067 | A | * 6/1992 | Erdman ........................ 388/811 |
| 5,810,111 | A | 9/1998 | Takeuchi et al. |
| 5,894,211 | A | 4/1999 | Sugden |
| 6,407,530 | B1 | 6/2002 | Kwon et al. |
| 6,536,073 | B2 | 3/2003 | Uratani et al. |
| 7,233,121 | B2 * | 6/2007 | Wu et al. .................. 318/400.17 |
| 7,262,574 | B2 | 8/2007 | Koyanagi et al. |
| 7,395,003 | B2 | 7/2008 | Dan |
| 7,890,219 | B2 * | 2/2011 | Tuma ........................... 700/300 |
| 2003/0098660 | A1 | 5/2003 | Erdman et al. |
| 2004/0222765 | A1 | 11/2004 | Turner et al. |
| 2005/0029975 | A1 | 2/2005 | Carson et al. |
| 2005/0066634 | A1 | 3/2005 | Genn et al. |
| 2006/0101610 | A1 | 5/2006 | Oh et al. |
| 2007/0143953 | A1 | 6/2007 | Hwang et al. |

(Continued)

FOREIGN PATENT DOCUMENTS

| EP | 1129657 | 9/2001 |
| EP | 1 495 710 | 1/2005 |

(Continued)

OTHER PUBLICATIONS

Search Report dated Nov. 9, 2012, directed to GB Application No. 1211754.5; 1 page.

(Continued)

*Primary Examiner* — David S Luo
(74) *Attorney, Agent, or Firm* — Morrison & Foerster LLP

(57) ABSTRACT

A method of preheating a brushless motor that includes sequentially energizing and de-energizing a phase winding over one or more drive periods. The phase winding is energized in the same direction throughout each drive period so as to lock a rotor of the motor at an aligned position.

24 Claims, 7 Drawing Sheets

(56) References Cited

U.S. PATENT DOCUMENTS

| | | |
|---|---|---|
| 2009/0154905 A1 | 6/2009 | Strike et al. |
| 2009/0178236 A1 | 7/2009 | Yun et al. |
| 2010/0156338 A1 | 6/2010 | Lu et al. |
| 2010/0242213 A1 | 9/2010 | Sunderland et al. |
| 2010/0242216 A1 | 9/2010 | MacNaughton |
| 2010/0263161 A1 | 10/2010 | Lee et al. |
| 2011/0095717 A1 | 4/2011 | Takizawa |
| 2011/0219577 A1 | 9/2011 | Conrad |
| 2012/0112681 A1 | 5/2012 | Bonvin et al. |
| 2012/0119686 A1 | 5/2012 | Bertotto et al. |
| 2014/0009095 A1 | 1/2014 | Greetham et al. |

FOREIGN PATENT DOCUMENTS

| | | |
|---|---|---|
| EP | 1 676 514 | 7/2006 |
| EP | 1 677 411 | 7/2006 |
| EP | 1 779 758 | 5/2007 |
| EP | 1 779 761 | 5/2007 |
| EP | 1 952 743 | 8/2008 |
| EP | 2 028 759 | 2/2009 |
| EP | 2 064 981 | 6/2009 |
| EP | 2 201 880 | 6/2010 |
| EP | 2 322 070 | 5/2011 |
| EP | 2 436 290 | 4/2012 |
| FR | 1310618 | 11/1962 |
| FR | 2 977 412 | 1/2013 |
| GB | 645847 | 11/1950 |
| GB | 2468151 | 9/2010 |
| GB | 2475312 | 5/2011 |
| GB | 2475313 | 5/2011 |
| GB | 2480902 | 12/2011 |
| GB | 2484120 | 4/2012 |
| JP | 3-88980 | 4/1991 |
| JP | 5-95859 | 4/1993 |
| JP | 7-337072 | 12/1995 |
| JP | 9-33117 | 2/1997 |
| JP | 11-159467 | 6/1999 |
| JP | 2001-314356 | 11/2001 |
| JP | 2007-202230 | 8/2007 |
| JP | 2008-43094 | 2/2008 |
| JP | 2009-198139 | 9/2009 |
| WO | WO-99/29035 | 6/1999 |
| WO | WO-2004/103142 | 12/2004 |
| WO | WO-2008/117945 | 10/2008 |
| WO | WO-2010/097612 | 9/2010 |
| WO | WO-2010/112885 | 10/2010 |
| WO | WO-2011/096143 | 8/2011 |
| WO | WO-2011/152184 | 12/2011 |

OTHER PUBLICATIONS

Greetham et al., U.S. Office Action mailed Oct. 24, 2014, directed to U.S. Appl. No. 13/933,473; 16 pages.

* cited by examiner

| Control Signals | | | Power Switches | | | | Inverter Condition |
|---|---|---|---|---|---|---|---|
| DIR1 | DIR2 | FW# | Q1 | Q2 | Q3 | Q4 | |
| 0 | 0 | X | 0 | 0 | 0 | 0 | Off |
| 1 | 0 | 1 | 1 | 0 | 0 | 1 | Drive Left-to-Right |
| 0 | 1 | 1 | 0 | 1 | 1 | 0 | Drive Right-to-Left |
| 1 | 0 | 0 | 0 | 0 | 0 | 1 | Freewheel Left-to-Right |
| 0 | 1 | 0 | 0 | 0 | 1 | 0 | Freewheel Right-to-Left |
| 1 | 1 | X | - | - | - | - | Illegal |

Fig. 3

METHOD OF PREHEATING A BRUSHLESS MOTOR

REFERENCE TO RELATED APPLICATIONS

This application claims the priority of United Kingdom Application No. 1211754.5, filed Jul. 3, 2012, the entire contents of which are incorporated herein by reference.

FIELD OF THE INVENTION

The present invention relates to a method of preheating a brushless motor.

BACKGROUND OF THE INVENTION

It may be necessary to start a brushless motor at temperatures well below that of the normal running temperature. At relatively low temperatures, the viscosity of the grease within the bearings of the motor may hamper or prevent the motor from starting. Additionally, at sub-zero temperatures, icing may occur between the rotor and stator, which further hampers or prevents starting of the motor. Even if it is possible to start the motor, driving the motor under such conditions may damage components of the motor.

Schemes for preheating a motor are known but generally suffer from one or more disadvantages. For example, the motor may include a heating device that heats the motor to a predetermined temperature prior to starting. However, the provision of a heating device increases the cost of the motor.

SUMMARY OF THE INVENTION

The present invention provides a method of preheating a brushless motor, the method comprising sequentially energising and de-energising a phase winding of the motor over one or more drive periods, the phase winding being energised in the same direction throughout each drive period so as to lock a rotor of the motor at an aligned position.

By sequentially energising and de-energising a phase winding, power losses (e.g. copper losses, iron losses and switch losses) act to heat the motor. Consequently, a separate heating device may be avoided. By energising the phase winding in a direction that locks the rotor at the aligned position, heating of the motor may be achieved whilst maintaining the rotor at a fixed position. As a result, potential damage to components of the motor (e.g. bearings), which might otherwise occur if the rotor were to rotate, may be avoided.

Depending on the position at which the rotor parks, the rotor may rotate at the start of a drive period before coming to rest at the aligned position. Nevertheless, any movement of the rotor will be relatively small. In particular, the rotor is prevented from making a complete revolution. Accordingly, potential damage to components of the motor, which might otherwise occur if the rotor free were to rotate at speed, may be avoided.

The motor may be unidirectional and the phase winding may be energised in a direction that drives the motor backwards. The rotor of a brushless motor typically parks at a position for which the rotor poles are misaligned slightly relative to the stator poles. For a unidirectional motor, the rotor typically parks at a position for which the rotor poles are slightly forward of the stator poles. By energising the phase winding in a direction that drives the motor backwards, the rotor moves through a relatively small angle before coming to rest at the aligned position. Consequently, movement of the rotor during preheating may be minimised.

Where the method comprises sequentially energising and de-energising the phase winding over a plurality of drive periods, the drive periods may be contiguous, i.e. one drive period may be immediately followed by a further drive period. Alternatively, the drive periods may be spaced apart. In particular, each pair of drive periods may be spaced by a dwell period during which the phase winding is de-energised. Heat generated during each drive period then has a longer period of time to propagate throughout the motor system.

The method may comprise sensing a temperature (e.g. temperature within the motor) and using the sensed temperature to define the length of each drive period and/or the total number of drive periods. In particular, the method may comprise defining a longer drive period and/or a larger number of drive periods for a lower temperature, and vice versa. By defining the length of each drive period and/or the total number of drive periods as a function of temperature, the phase winding may be energised and de-energised over a total period of time that is sufficient to raise the temperature of the motor to a level at which the motor may be safely started.

Current may be made to flow through at least one switch when energising the phase winding and current may be made to flow through at least one further switch when de-energising the phase winding. Owing to the electrical resistance associated with the switches, each switch dissipates heat when conducting current. By ensuring that current flows through at least one switch during energisation and through at least one further switch during de-energisation, at least two different heat sources are created during each drive period. Consequently, a faster rate of heating may be achieved. Current may be made to flow through a first pair of switches when energising the phase winding and current may be made to flow through a second, different pair of switches when de-energising the winding. As a result, four heat sources are created during each drive period. Consequently, heating of the motor is both better balanced and quicker.

The method may comprise de-energising the phase winding in response to current in the phase winding exceeding a current limit. A different current limit may then be employed for each drive period. For example, a higher current limit may be employed for each successive drive period. Alternatively, the current limit may be increased at least once during the one or more drive periods. For example, the method may comprise increasing the current limit periodically. In both instances, the current limit may be increased by a fixed amount or by an amount that depends on some other quantity, e.g. the temperature within the motor. By gradually increasing the current limit over time, a relatively quick rate of heating may be achieved without subjecting the motor to thermal shock.

The method may comprise sensing a temperature, using the sensed temperature to define a current limit, and de-energising the phase winding in response to current in the phase winding exceeding the current limit. By defining a current limit that depends on temperature (e.g. the temperature within the motor), the motor may be heated at a rate that avoids thermal shock. The sensed temperature may be used to define an initial current limit that is subsequently increased (e.g. periodically or at the end of each drive period) by a fixed amount or by an amount that depends on a change in the sensed temperature. Accordingly, as the temperature of the motor increases, the current limit may be increased so as to maintain a relatively quick rate of heating.

The present invention also provides a control system for a brushless motor, the control system performing a method as described in any one of the preceding paragraphs.

The present invention further provides a motor system comprising a brushless motor and a control system as described in the preceding paragraph.

BRIEF DESCRIPTION OF THE DRAWINGS

In order that the present invention may be more readily understood, embodiments of the invention will now be described, by way of example, with reference to the accompanying drawings, in which:

FIG. 3 details the allowed states of the inverter in response to control signals issued by the controller of the motor system;

DETAILED DESCRIPTION OF THE INVENTION

Figure 1:
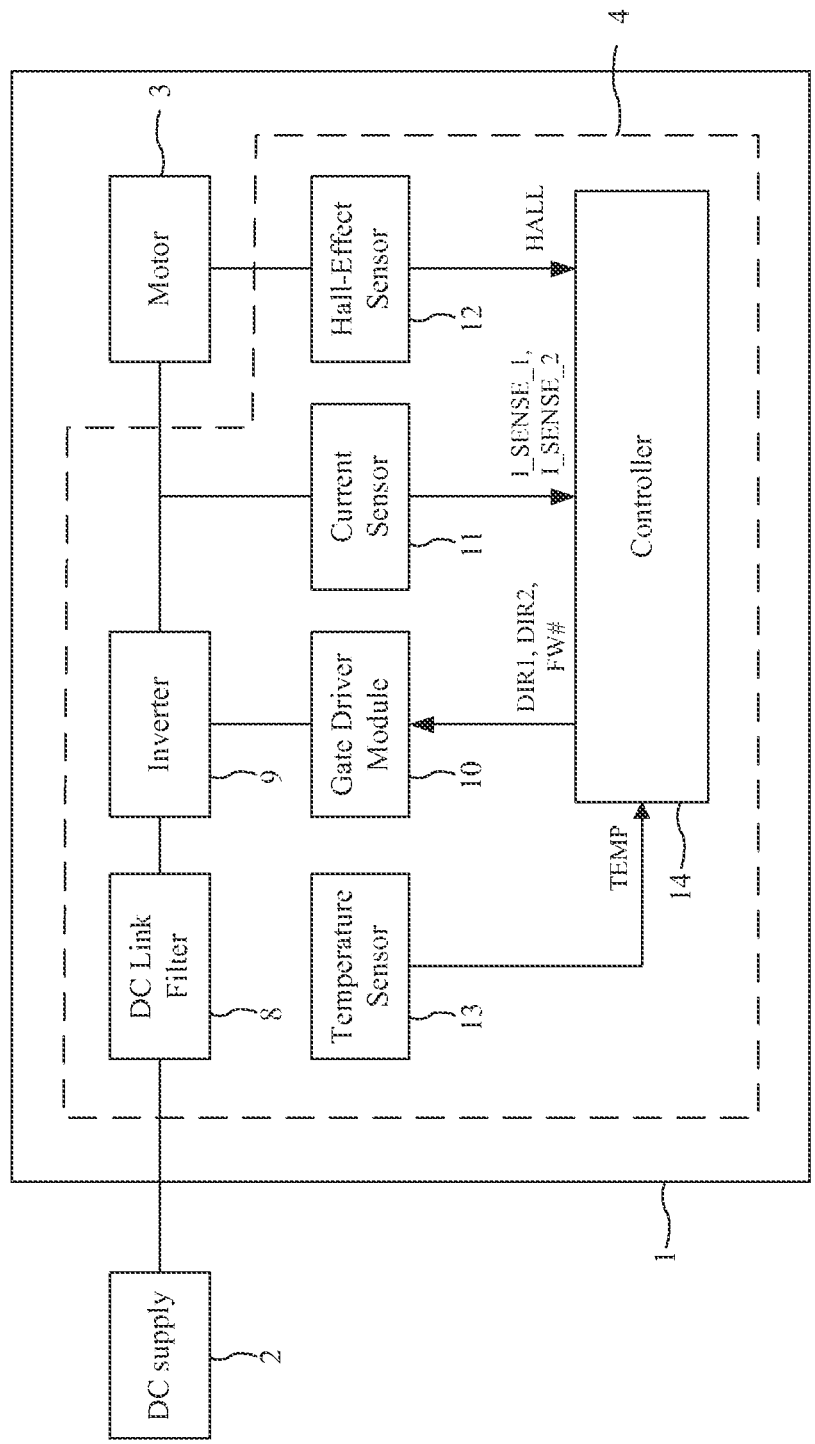
FIG. 1 is a block diagram of a motor system in accordance with the present invention.
Figure 2:
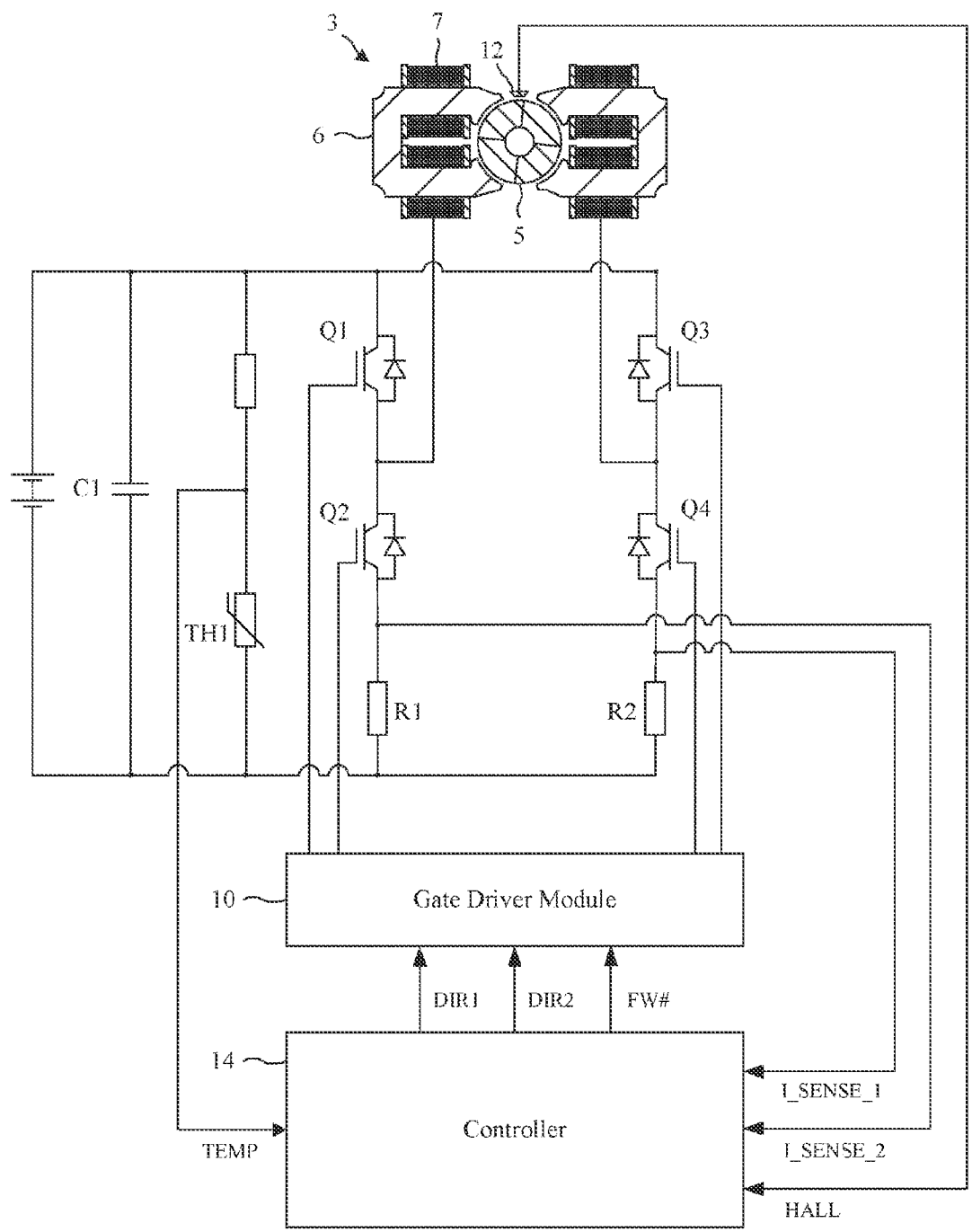
FIG. 2 is a schematic diagram of the motor system.

The motor system 1 of FIGS. 1 and 2 is powered by a DC power supply 2 and comprises a brushless motor 3 and a control system 4.

The motor 3 comprises a four-pole permanent-magnet rotor 5 that rotates relative to a four-pole stator 6. Conductive wires are wound about the stator 6 and are coupled together (e.g. in series or parallel) to form a single phase winding 7.

The control system 4 comprises a DC link filter 8, an inverter 9, a gate driver module 10, a current sensor 11, a Hall-effect sensor 12, a temperature sensor 13, and a controller 14.

The DC link filter 8 comprises a capacitor C1 that smoothes the relatively high-frequency ripple that arises from switching of the inverter 9.

The inverter 9 comprises a full bridge of four power switches Q1-Q4 that couple the DC link voltage to the phase winding 7. Each of the switches Q1-Q4 includes a freewheel diode.

The gate driver module 10 drives the opening and closing of the switches Q1-Q4 in response to control signals received from the controller 14.

The current sensor 11 comprises a pair of sense resistors R1,R2, each resistor located on a lower leg of the inverter 9. The voltage across each resistor R1,R2 is output to the controller 14 as a current sense signal, I_SENSE_1 and I_SENSE_2. The first current sense signal, I_SENSE_1, provides a measure of the current in the phase winding 7 when driven from right to left (as is described below in more detail). The second current sense signal, I_SENSE_2, provides a measure of the current in the phase winding 7 when driven from left to right.

The Hall-effect sensor 12 is located in a slot opening of the stator 6 and outputs a digital signal, HALL, that is logically high or low depending on the direction of magnetic flux through the sensor 12. The HALL signal therefore provides a measure of the angular position of the rotor 5.

The temperature sensor 13 comprises a thermistor TH1 located within the motor system 1. The voltage across the thermistor TH1 is output to the controller 14 as a temperature signal, TEMP.

The controller 14 comprises a microcontroller having a processor 15, a memory device 16 and a plurality of peripherals 17 (e.g. comparators, timers etc.). A suitable candidate is the PIC16F690 microcontroller by Microchip Technology Inc. The memory device 16 stores instructions for execution by the processor 15, as well as control parameters and lookup tables that are employed by the processor 15 during operation of the motor system 1. The controller 14 is responsible for controlling the operation of the motor system 1 and generates three control signals: DIR1, DIR2, and FW#. The control signals are output to the gate driver module 10, which in response drives the opening and closing of the switches Q1-Q4 of the inverter 9.

DIR1 and DIR2 control the direction of current through the inverter 9 and thus through the phase winding 7. When DIR1 is pulled logically high and DIR2 is pulled logically low, the gate driver module 10 closes switches Q1 and Q4, and opens switches Q2 and Q3, thus causing current to be driven through the phase winding 7 from left to right. Conversely, when DIR2 is pulled logically high and DIR1 is pulled logically low, the gate driver module 10 closes switches Q2 and Q3, and opens switches Q1 and Q4, thus causing current to be driven through the phase winding 7 from right to left. Current in the phase winding 7 is therefore commutated by reversing DIR1 and DIR2. If both DIR1 and DIR2 are pulled logically low, the gate drive module 10 opens all switches Q1-Q4.

FW# is used to disconnect the phase winding 7 from the DC link voltage and allow current in the phase winding 7 to freewheel around the low-side loop of the inverter 9. Accordingly, in response to a FW# signal that is pulled logically low, the gate driver module 10 causes both high-side switches Q1,Q3 to open. Each power switch Q1-Q4 conducts in a single direction only. Consequently, current freewheels through one of the low-side switches Q2,Q4 and through a freewheel diode of the other low-side switch Q2,Q4. Certain types of power switch (e.g. MOSFETs) are capable of conducting in both directions. Accordingly, rather than freewheeling through a freewheel diode, both low-side switches Q2,Q4 may be closed such that current freewheels through both low-side switches Q2,Q4, i.e. in addition to opening both high-side switches Q1,Q3, both low-side switches Q2,Q4 are closed in response to a logically low FW# signal.

FIG. 3 summarises the allowed states of the switches Q1-Q4 in response to the control signals of the controller 14. Hereafter, the terms 'set' and 'clear' will be used to indicate that a signal has been pulled logically high and low respectively.

The controller 14 includes a number of peripherals 17 that are configured as a current limiter 20. The current limiter 20 monitors the level of current in the phase winding 7 and toggles a current-limit signal in the event that current in the phase winding 7 exceeds a current limit.

Figure 4:
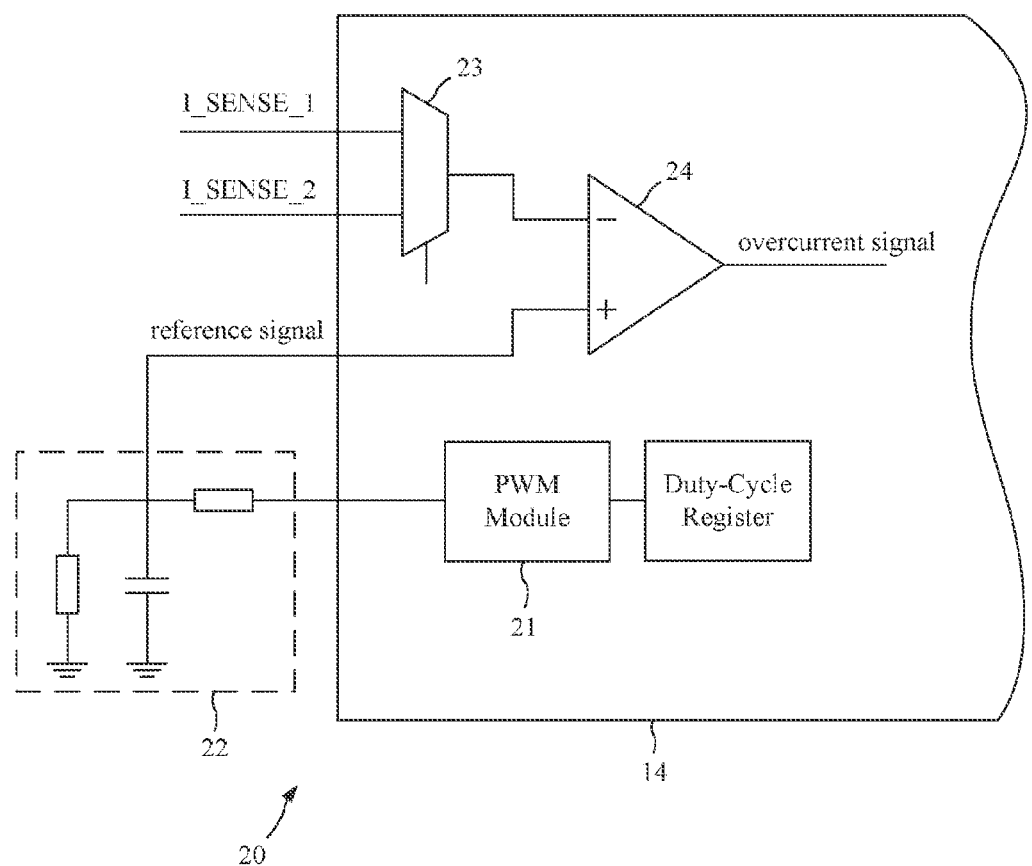
FIG. 4 illustrates a schematic diagram of the current limiter of the motor system.

As illustrated in FIG. 4, the current limiter 20 comprises a PWM module 21, a smoothing filter 22, a multiplexer 23 and a comparator 24. The PWM module 21, the multiplexer 23 and the comparator 24 form part of the peripherals 17 of the controller 14. The smoothing filter 22, on the other hand, is located external to the controller 14.

The PWM module 21 generates a pulsed voltage signal, which is output by the controller 14. The smoothing filter 22 smoothes the pulsed voltage signal to generate a reference signal having a regular voltage, which is then input to the controller 14. The PWM module 21 employs a constant period and a variable duty cycle that is set by the processor 15. Accordingly, the voltage of the reference signal depends on the duty cycle set by the processor 15.

The multiplexer 23 has two inputs for selecting one of the two current-sense signals, I_SENSE_1 and I_SENSE_2. The selection made by the multiplexer 23 is controlled by the processor 15 in response to the direction of current through the phase winding 7. Consequently, when DIR1 is set, the multiplexer 23 selects I_SENSE_1, and when DIR2 is set, the multiplexer 23 selects I_SENSE_2. The output of the multiplexer 23 is delivered to the comparator 24.

The comparator 24 compares the voltage of the current-sense signal, I_SENSE_1 or I_SENSE_2, with the voltage of the reference signal. When the voltage of the current-sense signal exceeds that of the reference signal, the comparator 24 outputs a current-limit signal that is pulled logically low. Otherwise, the comparator 24 outputs a current-limit signal that is pulled logically high.

The current limiter 20 therefore toggles the current-limit signal when the voltage of the current-sense signal exceeds that of the reference signal. Since the voltage of the current-sense signal is directly proportional to the current in the phase winding 7, the current limiter 20 toggles the current-limit signal when current in the phase winding 7 exceeds a current limit. The current limit is then defined by the duty cycle of the PWM module 21, which is set by the processor 15 of the controller 14.

The memory device 16 of the controller 14 stores a current-limit lookup table, which comprises different current limits (i.e. different duty cycles) for different temperatures. As explained below, the controller 14 uses this table during start-up to select a current limit according to the temperature within the motor system 1.

During normal running, the motor system 1 operates within a nominal temperature range. However, the motor system 1 may be required to start at temperatures well below that of the nominal temperature range. At relatively low temperatures, the motor system 1 may behave erratically if an attempt is made to start the motor 3 using conventional methods. Furthermore, components of the motor system 1 (e.g. bearings) may be damaged if the motor 3 is driven at low temperatures. The motor system 1 therefore employs a start-up routine that is intended to address these problems.

Figure 5:
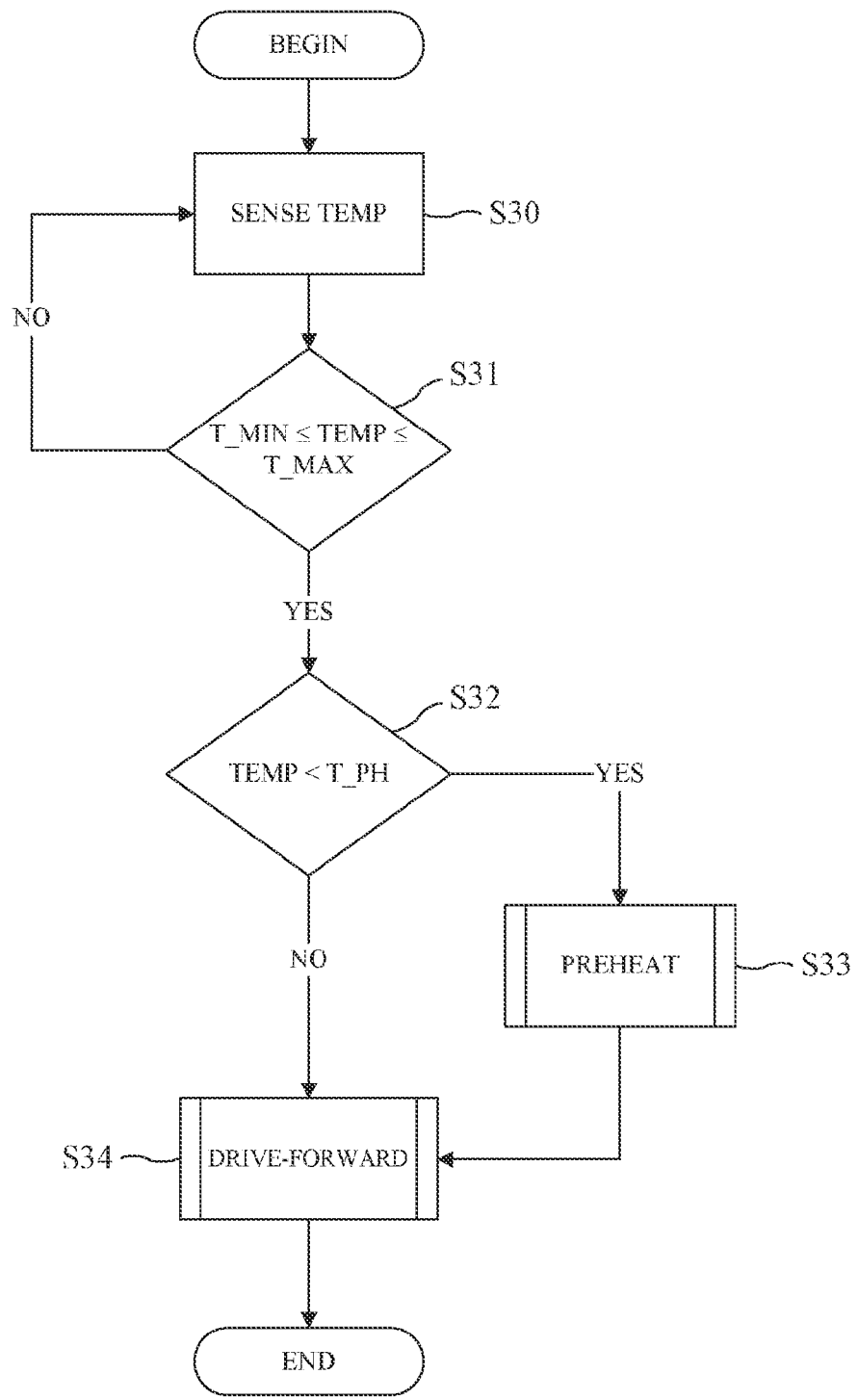
FIG. 5 is a flow diagram of a start-up routine implemented by the motor system.

The start-up routine employed by the controller 14 is illustrated in FIG. 5. The controller 14 begins by first sensing the TEMP signal (step S30), which provides a measure of the temperature within the motor system 1. The motor system 1 operates over a temperature range defined between a lower threshold, T_MIN, and an upper threshold, T_MAX. Accordingly, if the temperature within the motor system 1 is less than T_MIN or greater than T_MAX (step S31), the controller 14 makes no attempt to start the motor 3. If the temperature is greater than T_MIN but less than a preheat threshold, T_PH (step S32), the controller 14 executes a preheat routine (step S33). Otherwise, the controller 14 executes a drive-forward routine (step S34).

Figure 6:
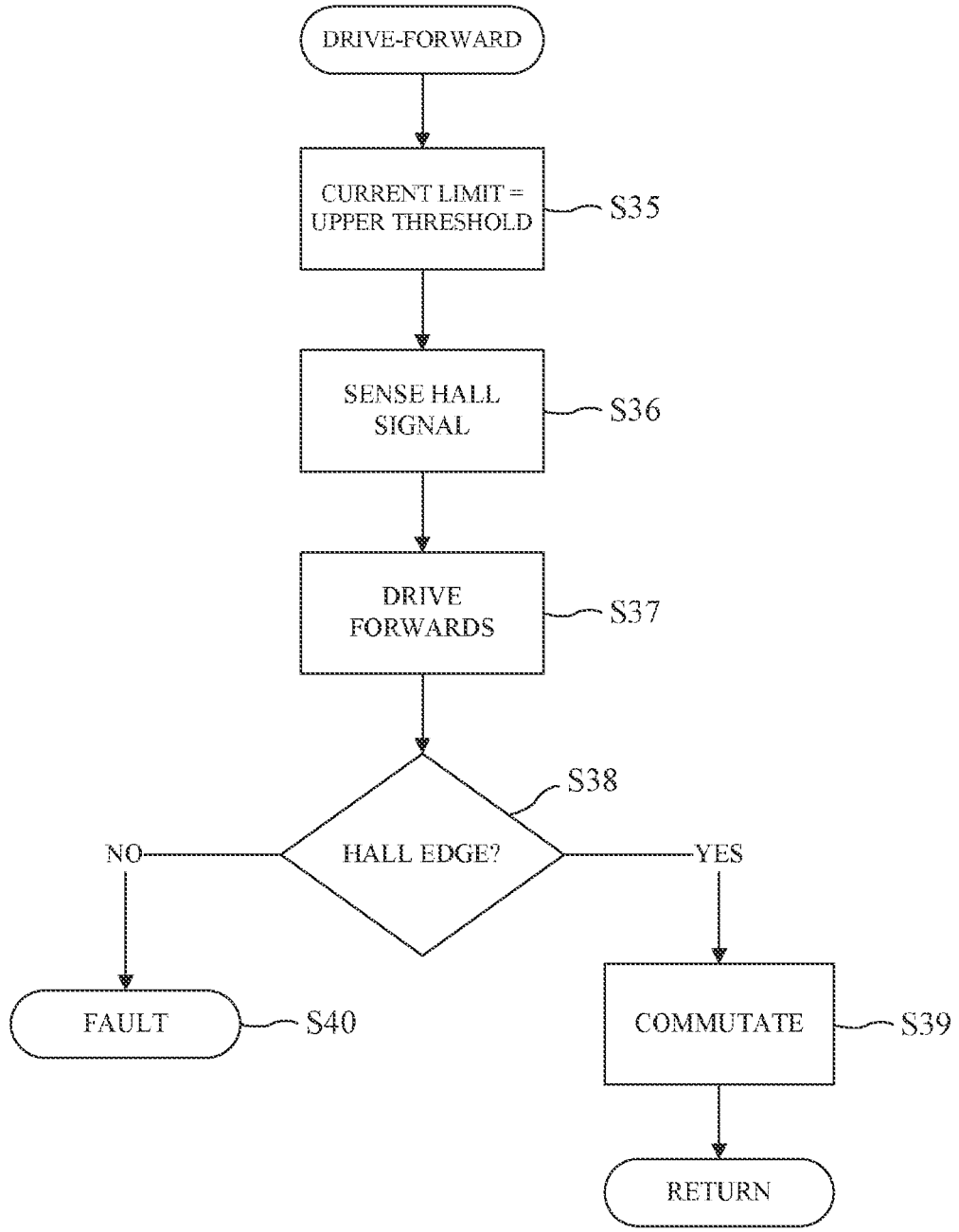
FIG. 6 is a flow diagram of a drive-forward routine implemented by the motor system.

The drive-forward routine is illustrated in FIG. 6. The controller 14 begins by first setting the current limit to an upper threshold (step S35), i.e. the controller 14 sets the duty-cycle of the PWM module 21 of the current limiter 20 such that the current-limit signal is toggled when current in the phase winding 7 exceeds the upper threshold. The controller 14 then senses the HALL signal in order to determine the position at which the rotor 5 has parked (step S36). Using this information, the controller 14 energises the phase winding 7 in a direction that drives the rotor 5 forward (step 37). For the purposes of the present description, it will be assumed that the rotor 5 is driven forwards in response to energising the phase winding 7 from left-to-right when the HALL signal is logically low, and from right-to-left when the HALL signal is logically high. The rotor 5 is then driven backwards in response to energising the phase winding 7 from right-to-left when the HALL signal is logically low and from left-to-right when the HALL signal is logically high.

The air gap between the rotor 5 and the stator 6 is asymmetric. As a result, the rotor 5 parks at a position for which the rotor poles are misaligned slightly (e.g. by 5 mechanical degrees) relative to the stator poles. This then ensures that, when the phase winding 7 is energised in a direction that is intended to drive the rotor 5 forwards, the rotor 5 rotates in the correct direction.

The controller 14 drives the rotor forwards (step S37) for a predetermined period of time. During this period, which will hereafter be referred to as the drive-forward period, an edge should occur in the HALL signal if the rotor 5 is rotating forwards as expected (step S38). In response to the HALL edge, the controller 14 commutates the phase winding 7 by reversing DIR1 and DIR2 (step S39). On commutating the phase winding 7, the controller 14 ends the start-up routine and executes a routine to accelerate the rotor 5 in a conventional manner. If no HALL edge is detected during the drive-forward period, the controller 14 assumes that a fault has occurred and turns the motor off by clearing both DIR1 and DIR2 (step S40).

When driving the rotor 5 forwards (step S37), the magnitude of current through the phase winding 7 rises during energisation. When the phase current exceeds the current limit, the current limiter 20 toggles the current-limit signal. In response to the change in the current-limit signal, the controller 14 freewheels the phase winding 7 by clearing FW#. The controller 14 freewheels the phase winding 7 for a freewheel period, during which time current in the phase winding 7 decays to a level below the current limit. At the end of the freewheel period, the controller 14 again energises the phase winding 7. The controller 14 therefore sequentially energises and freewheels the phase winding 7 during the drive-forward period. At the point of commutation (i.e. when the HALL edge is detected during the drive-forward period), the phase winding 7 may be freewheeling. Accordingly, in addition to reversing DIR1 and DIR2, the controller 14 sets FW# so as to ensure that the inverter 9 is returned to a drive condition.

Figure 7:
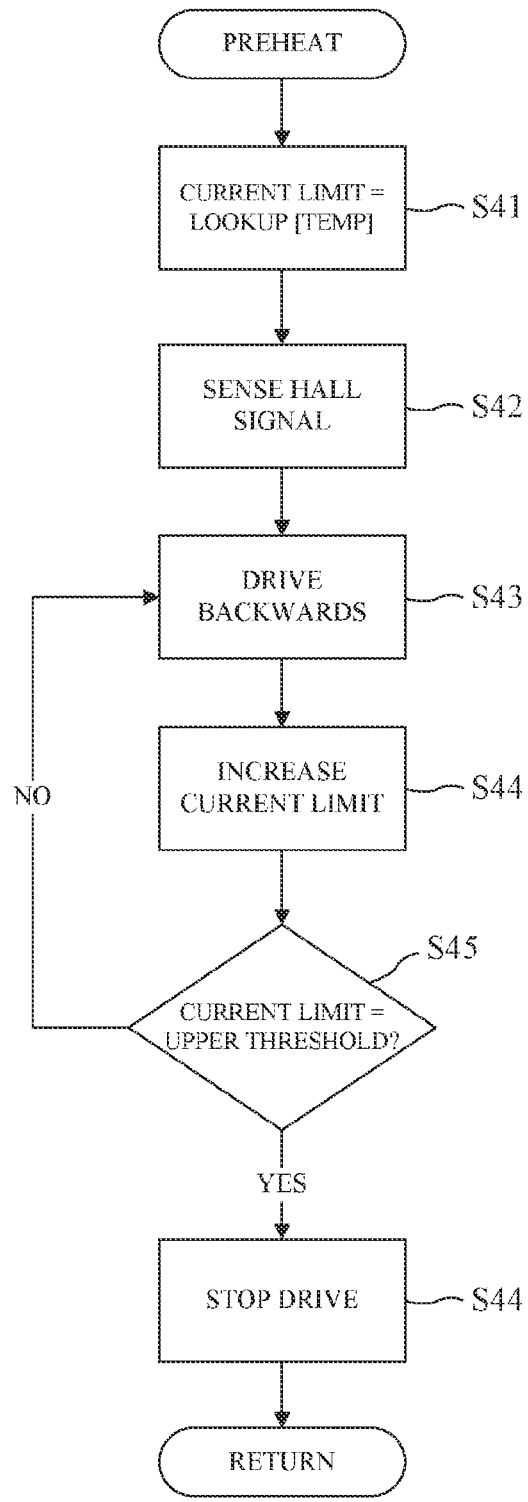
FIG. 7 is a flow diagram of a preheat routine implemented by the motor system.

The preheat routine is illustrated in FIG. 7. The controller 14 begins by indexing the current-limit lookup table using the temperature obtained from the TEMP signal to select a current limit (step S41). The controller 14 then senses the HALL signal in order to determine the position at which the rotor 5 has parked (step S42). The controller 14 then energises the phase winding 7 in a direction that drives the rotor 5 backwards (step S43).

As noted above, the rotor 5 parks at a position for which the rotor poles are misaligned slightly relative to the stator poles. Consequently, in response to driving the rotor 5 backwards (step S43), the rotor 5 rotates backwards through a small angle (e.g. 5 mechanical degrees) before stopping at the fully aligned position.

The controller 14 drives the rotor 5 backwards (step S43) for a predetermined period of time, which will hereafter be referred to as the drive-backward period. During this period, the rotor 5 is locked at the fully aligned position. In response to energising the phase winding 7, current in the phase winding 7 rises. When the phase current exceeds the current limit, the current limiter 20 toggles the current-limit signal. In response to the change in the current-limit signal, the controller 14 de-energises the phase winding 7. De-energisation may involve freewheeling the phase winding 7. However, for reasons that are explained below, de-energisation instead involves opening all switches Q1-Q4 of the inverter 9 by clearing DIR1 and DIR2. The controller 14 de-energises the phase winding 7 for a de-energisation period, during which time current in the phase winding 7 decays to a level below the current limit. At the end of the de-energisation period, the controller 14 again energises the phase winding 7. Consequently, the controller 14 sequentially energises and de-energises the phase winding 7 during the drive-backward period.

At the end of the drive-backward period, the controller 14 increases the current limit by a fixed amount (step S44). The controller 14 then compares the current limit against the upper threshold (step S45), i.e. the value used by the controller 14 when executing the drive-forward routine. If the current limit corresponds to the upper threshold, the controller 14 stops driving the rotor 5 by clearing DIR and DIR2 (step S46). Owing to the asymmetry in the air gap, the rotor 5 then rotates forward through the small angle (e.g. 5 mechanical degrees) and comes to rest at the original parked position. The controller 14 then ends the preheat routine and executes the drive-forward routine (step S34). If the current limit is less than the upper threshold, the controller 14 repeats the step of driving the rotor backwards for the drive-backward period (step S43). The rotor 5 therefore continues to be locked at the aligned position. This time, however, the current limit is greater. At the end of the drive-backward period, the controller 14 again increases the current limit (step S44) and compares this against the upper threshold (step S45). The controller 14 therefore increases periodically the current limit until the upper threshold is reached, at which point the controller 14 ends the preheat routine and executes the drive-forward routine (step S34).

By sequentially energising and de-energising the phase winding 7, power losses associated with the phase winding 7 (copper loss), the stator 6 (iron loss) and the power switches Q1-Q4 (conduction and switching losses) act to heat the motor system 1. Throughout each drive-backward period, the rotor 5 is locked at the aligned position. Consequently, with the exception of the initial movement to the aligned position, the rotor 5 does not rotate during heating of the motor system 1. As a result, potential damage to components of the motor 3 (e.g. the bearings), which might otherwise occur if the rotor 5 were to rotate, may be avoided.

The controller 14 drives the rotor 5 backwards for one or more drive-backward periods. The number of drive-backward periods depends on the initial temperature within the motor system 1. In particular, a larger number of drive-backward periods are employed for a lower temperature. This then ensures that the phase winding 7 is energised and de-energised for a total period of time sufficient to raise the temperature of the motor system 1 to a level at which the motor 3 may be safely started.

At the start of the preheat routine, the controller 14 selects a current limit that depends on the initial temperature within the motor system 1. More specifically, a lower current limit is selected for a lower temperature. By selecting a current limit that depends on the initial temperature within the motor system 1, thermal shock to the motor system 1 may be avoided. For example, by employing a lower current limit at lower temperatures, the power losses that arise during energisation and de-energisation are smaller. Consequently, the temperatures of the various heat sources (e.g. the phase winding 7, the stator 6 and the power switches Q1-Q4) are lower and thus the temperature gradients within the motor system 1 are smaller. As a result, thermal shock may be avoided.

During execution of the preheat routine, the controller 14 increases periodically the current limit until an upper threshold is reached. By increasing the current limit, the power losses associated with energisation and de-energisation are increased. As a result, the temperatures of the various heat sources are increased and thus a faster rate of heating may be achieved. The current limit is increased periodically by an amount that ensures that the increase in the temperatures of the various heat sources does not greatly exceed the increase in the temperature of the motor system 1. As a result, thermal shock continues to be avoided.

Owing to the electrical resistance of the power switches Q1-Q4, each power switch Q1-Q4 dissipates heat when conducting current. During energisation of the phase winding 7, a first pair of power switches (e.g. Q1 and Q4) is closed. Current then flows through each of these two switches, which in turn dissipate heat, e.g. via a heat sink secured to each switch. When the magnitude of current in the phase winding 7 exceeds the current limit, the controller 14 de-energises the phase winding 7. As noted above, de-energisation may comprise freewheeling the phase winding 7. However, as will now be explained, there are advantages in opening all switches Q1-Q4 of the inverter 9 during de-energisation. If the controller 14 were to freewheel the phase winding 7, the controller 14 would open the high-side switch (e.g. Q1). Current would then flow around the low-side loop of the inverter 9, i.e. current would flow down through the already closed low-side switch (e.g. Q4) and up through the diode of the other low-side switch (e.g. Q2). Consequently, a further power switch (e.g. Q2) conducts current during de-energisation. This then has the benefit of creating a further heat source. However, if all power switches Q1-Q4 of the inverter 9 are opened during de-energisation, current in the phase winding 7 is forced up through the diodes of the other pair of power switches (e.g. Q2 and Q3). Consequently, a further two power switches conduct current during de-energisation, thereby creating two additional heat sources. Heating of the motor system 1 is therefore better balanced. In particular, a first pair of heat sources (e.g. power switches Q1 and Q4) are created during energisation and a second, different pair of heat sources (e.g. power switches Q2 and Q3) are created during de-energisation. In addition to more balanced heating, the motor system 1 may be heated more rapidly without necessarily increasing the risk of thermal shock or potentially damaging the power switches.

In the embodiment described above, the controller 14 increases the current limit by a fixed amount at the end of each drive-backward period (step S44). The controller 14 then ends the preheat routine when an upper threshold has been reached for the current limit (step S45). Alternatively, rather than increasing the current limit by a fixed amount, the controller 14 might sense the TEMP signal at the end of each drive-backward period, and then use the sensed temperature to select a new current limit from the current-limit lookup table. The controller 14 might then end the preheat routine when the current limit corresponds to the upper threshold or when the temperature within the motor system 1 exceeds a threshold. With this alternative scheme, the current limit is adjusted in direct response to changes in the temperature within the motor system 1. Accordingly, if the temperature within the motor system 1 is rising at a faster or slower rate than expected, the controller 14 is able to compensate by selecting an appropriate current limit. A possible difficulty with this scheme, however, is that the temperature sensed by the temperature sensor 13 may not accurately reflect the temperature of the components of the motor system 1 once heating begins. For example, the power switches Q1-Q4 may be located in close proximity to the temperature sensor 13. The heat dissipated by the power switches Q1-Q4 is therefore likely to be felt first by the temperature sensor 13. Other components of the motor system 1, on the other hand, may be located further from the power switches Q1-Q4. As a result, the temperature sensor 13 may register significant changes in temperature when other components of the motor system 1 have experienced little or no temperature change. The original scheme overcomes this potential problem by gradually increasing the current limit over time, irrespective of the temperature inside the motor system 1.

In spite of the advantages in employing a variable current limit (i.e. one that changes with time or in response to changes in temperature within the motor system 1), the controller 14 may conceivably employ a fixed current limit. In this instance, the controller 14 then employs a drive-backward period that depends on the initial temperature within the motor system 1. For example, the controller 14 may store a lookup table that comprises different drive-backward periods for different temperatures. Accordingly, in spite of the single current limit, the controller 14 drives the rotor 5 backwards for a period of time sufficient to raise the temperature of motor system 1 to a level at which the motor 3 may be safely started. If thermal shock continues to be a concern, the current limit may be set at a relatively low level.

In the embodiment described above, the length of each drive-backward period is the same. Consequently, the period between each increment in the current limit is the same. This then has the advantage of simplifying the instructions executed by the controller 14. However, it may be desirable to heat for longer periods at lower temperatures. This may, for example, further mitigate thermal shock. One way in which this might be achieved would be to employ a lookup table that comprises different current limits and different drive-backward periods for different temperatures. The controller 14 may then use the TEMP signal, at the start of the preheat routine and at the end of each drive-backward period, to index the current-limit lookup table to select a current limit and a drive-backward period.

During each drive-backward period, the controller 14 sequentially energises and de-energises the phase winding 7. The resulting power losses then act to heat the motor system 1. Components of the motor system 1 having a good thermal path to the various heat sources (e.g. stator 6, phase winding 7 and power switches Q1-Q4) will warm relatively quickly. In contrast, components having a poor thermal path will warm relatively slowly. Consequently, at the end of the preheat routine, it is possible that some of the components may not have reached a safe operating temperature. Alternatively, those components having a good thermal path must be held at a higher temperature for a longer period in order that the components having a poor thermal path reach a safe operating temperature. In the embodiment described above, each drive-backward period is followed immediately by either a further drive-backward period (as part of the preheat routine) or a drive-forward period (as part of the drive-forward routine). In an alternative embodiment, each drive-backward period may be followed by a dwell period, during which time the controller 14 stops driving the rotor 5 by clearing DIR and DIR2. As a result, the heat generated during each drive-backward period has a longer period of time to propagate throughout the motor system 1 and thus warm those components having a poor thermal path. At the end of the dwell period, the controller 14 proceeds in the same manner as described above, i.e. the controller 14 increases the current limit (S44) and compares the current limit against the upper threshold (S45). The controller 14 may employ a fixed dwell period at the end of each drive-backward period. Alternatively, the controller 14 may employ a dwell period that depends on the temperature within the motor system 1. For example, the controller 14 may employ a longer dwell period at lower temperatures.

When executing the preheat routine, the controller 14 energises the phase winding 7 in a direction that drives the rotor backwards (step S43). This then has the benefit that the rotor 5 rotates through a relatively small angle (e.g. 5 mechanical degrees) before coming to rest at the fully aligned position. Conceivably, the controller 14 might alternatively energise the phase winding 7 in a direction that drives the rotor 5 forwards. The rotor 5 would then rotate through a larger angle (e.g. 85 mechanical degrees) before coming to rest at the fully aligned position. Nevertheless, movement of the rotor 5 continues to be relatively small. In particular, the rotor 5 is prevented from making a full revolution. Accordingly, potential damage to components of the motor system 1, which might otherwise occur if the rotor 5 were free to rotate at speed, may be avoided.

Reference has thus far been made to preheating a single-phase, permanent-magnet brushless motor 3. However, the preheat routine described above may equally be used to preheat other types of brushless motor, including but not limited to multi-phase motors and switched reluctance motors.

The invention claimed is:

1. A method of preheating a brushless motor, the method comprising sensing a temperature of the motor, and sequentially energising and de-energising a phase winding of the motor over one or more drive periods, wherein the sensed temperature is used to define the length of each drive period or the number of drive periods, and the phase winding is energised in the same direction throughout each drive period so as to lock a rotor of the motor at an aligned position.

2. The method of claim 1, wherein the rotor is locked at the aligned position for at least one second during each drive period.

3. The method of claim 1, wherein the rotor is prevented from rotating through a full revolution during the one or more drive periods.

4. The method of claim 1, wherein the method comprises defining a longer drive period or a larger number of drive periods for a lower sensed temperature.

5. The method of claim 1, wherein current is made to flow through at least one switch when energising the phase winding and current is made to flow through at least one further switch when de-energising the phase winding.

6. The method of claim 5, wherein current is made to flow through a first pair of switches when energising the phase winding and current is made to flow through a second, different pair of switches when de-energising the phase winding.

7. The method of claim 1, wherein the method comprises de-energising the phase winding in response to current in the phase winding exceeding a current limit, and increasing the current limit at least once during the one or more drive periods.

8. The method of claim 7, wherein the method comprises increasing periodically the current limit.

9. The method of claim 1, wherein the method comprises de-energising the phase winding in response to current in the phase winding exceeding a current limit, and employing a different current limit for each drive period.

10. The method of claim 9, wherein the method comprises employing a higher current limit for each successive drive period.

11. The method of claim 1, wherein the method comprises sensing a temperature, using the sensed temperature to define a current limit, and de-energising the phase winding in response to current in the phase winding exceeding the current limit.

12. The method of claim 1, wherein the motor is unidirectional and the phase winding is energised in a direction that drives the motor backwards.

13. A control system for a brushless motor, the control system performing a method as claimed in claim 1.

14. A method of preheating a brushless motor, the method comprising sequentially energising and de-energising a phase winding of the motor over one or more drive periods, wherein the phase winding is energised in the same direction throughout each drive period so as to lock a rotor of the motor at an aligned position, the phase winding is de-energised in response to current in the phase winding exceeding a current limit, and the current limit is increased at least once during the one or more drive periods.

15. The method of claim 14, wherein the method comprises increasing periodically the current limit.

16. The method of claim 14, wherein the method comprises employing a different current limit for each drive period.

17. The method of claim 16, wherein the method comprises employing a higher current limit for each successive drive period.

18. A control system for a brushless motor, the control system performing a method of 15.

19. A method of preheating a brushless motor, the method comprising sensing a temperature of the motor, and sequentially energising and de-energising a phase winding of the motor over one or more drive periods, wherein the sensed temperature is used to define a current limit, the phase winding is energised in the same direction throughout each drive period so as to lock a rotor of the motor at an aligned position, and the phase winding is de-energising in response to current in the phase winding exceeding the current limit.

20. The method of claim 19, wherein the method comprises increasing the current limit at least once during the one or more drive periods.

21. The method of claim 20, wherein the method comprises increasing periodically the current limit.

22. The method of claim 19, wherein the method comprises employing a different current limit for each drive period.

23. The method of claim 22, wherein the method comprises employing a higher current limit for each successive drive period.

24. A control system for a brushless motor, the control system performing a method as claimed in claim 19.

* * * * *